United States Patent [19]
Revell et al.

[11] Patent Number: 5,838,237
[45] Date of Patent: Nov. 17, 1998

[54] PERSONAL ALARM DEVICE

[76] Inventors: Graeme Charles Revell; Ashley Mark Revell, both of 5093 N. Parkway Calabasas, Calabasas, Calif. 91302

[21] Appl. No.: 651,341

[22] Filed: May 22, 1996

[51] Int. Cl.⁶ .................................................. G01S 3/02
[52] U.S. Cl. ........................ 340/573; 340/539; 342/357
[58] Field of Search .............................. 340/539, 573; 342/357, 450

[56] References Cited

U.S. PATENT DOCUMENTS

| | | |
|---|---|---|
| 4,300,129 | 11/1981 | Cataldo . |
| 4,535,324 | 8/1985 | Levental . |
| 4,606,073 | 8/1986 | Moore . |
| 4,695,284 | 9/1987 | Leveille et al. . |
| 4,788,711 | 11/1988 | Nasco, Jr. . |
| 4,891,650 | 1/1990 | Sheffer . |
| 5,014,040 | 5/1991 | Weaver et al. ............... 340/572 |
| 5,021,794 | 6/1991 | Lawrence . |
| 5,055,851 | 10/1991 | Sheffer . |
| 5,218,367 | 6/1993 | Sheffer et al. . |
| 5,305,370 | 4/1994 | Kearns et al. . |
| 5,327,144 | 7/1994 | Stilp et al. .................... 342/387 |
| 5,334,974 | 8/1994 | Simms et al. . |
| 5,388,147 | 2/1995 | Grimes . |
| 5,461,365 | 10/1995 | Schlager et al. . |
| 5,497,149 | 3/1996 | Fast ............................... 340/988 |
| 5,517,199 | 5/1996 | DiMattei ...................... 342/357 |
| 5,550,551 | 8/1996 | Alesio .......................... 342/357 |
| 5,563,607 | 10/1996 | Loomis et al. ............... 342/357 |
| 5,638,077 | 6/1997 | Martin ......................... 342/357 |
| 5,652,570 | 7/1997 | Lepkofker ................... 340/573 |
| 5,686,910 | 11/1997 | Timm et al. ................. 340/988 |
| 5,687,215 | 11/1997 | Timm et al. ................. 379/58 |
| 5,701,328 | 12/1997 | Schuchman et al. ........ 375/204 |
| 5,712,899 | 1/1998 | Pace, II ........................ 379/58 |
| 5,726,659 | 3/1998 | Kee et al. .................... 342/352 |
| 5,742,908 | 4/1998 | Dent ............................. 455/517 |

*Primary Examiner*—Ronald L. Biegel
*Attorney, Agent, or Firm*—Merchant, Gould, Smith, Edell, Welter & Schmidt

[57] ABSTRACT

A self-contained personal alarm device capable of signaling its location to a remote site such as a security station. The personal alarm device includes a housing enclosing a controller, an antenna, a cellular transmitter and a cellular receiver. The controller is coupled to the transmitter and receiver, which are in turn coupled to the antenna. The controller controls the transmitter and the receiver to receive position location signals such as Global Positioning System signals (GPS), establish a cellular connection with a remote site, and transmit device location data to the remote site on the cellular connection, wherein the device location data indicates the location of the device. The cellular connection is established via a cellular telecommunication network that includes an array of cell base stations. The GPS signals are transmitted to the device over the cellular network by providing each cell base station with a Differential Global Positioning System (DGPS) receiver. Using the DGPS receivers, GPS signals are repeated over the cellular network.

37 Claims, 8 Drawing Sheets

PERSONAL ALARM DEVICE

BACKGROUND OF THE INVENTION

1. Field of the Invention

The invention relates in general to personal location systems, and more particularly, to a self-contained personal alarm device and system which uses a cellular telecommunication network both for transmitting Global Positioning Satellite signals to the device and for receiving position location signals from the device.

2. Description of Related Art

Many emergency or life-threatening situations arise where a person is unable to use a conventional telephone or even a cellular telephone to make a call to the police for help. Such situations include rape, abduction, incapacitance, etc. Besides the frequent unavailability of telephones in such circumstances, it is simple for an assailant or abductor to prevent a call from being made by immediately confiscating a cellular phone and/or moving the victim to a different location if a call is seen to be made. Furthermore, even if the victim is able to contact police authorities, the victim is often unable to give accurate location details.

To provide an alarm and signal the location of the victim, a class of alarm and locator devices has been developed which utilize radio beacons, either VHF or UHF transmitters, adapted to be worn by the person. For example, U.S. Pat. No. 4,535,324 utilizes a beacon activated by squeezing the sides of a finger ring and U.S. Pat. No. 4,300,129 teaches a radio alarm having a secret trigger mechanism contained in a belt buckle. Both of these patents have the advantage of being able to be worn on the person and activated without an assailant's knowledge. However, these systems suffer from an inability to be located or tracked over distances greater than a few hundred yards, especially in built-up urban areas. Hence, unless a law-enforcement team suitably equipped with direction-finding scanners happens to be patrolling in the near vicinity, no-one would ever know the device had been activated.

Alarm and locator devices have also been used in vehicle tracking systems, such as those disclosed in U.S. Pat. Nos. 4,891,650, 5,055,851 and 5,218,367. These vehicle tracking systems use a cellular network to signal an alarm and to determine the location of the missing or stolen vehicle. The location of the vehicle is determined either by the device itself or remotely. For example, the device may determine its location using the relative signal strength of the signals emitted by nearby cell sites. A remote location may determine the device's location using the strength of the vehicle device signal received by nearby cell sites.

Unfortunately, these systems are specifically designed for vehicles and are not suited for personal use. First, these devices are not concealable. In addition, these systems are inoperable high-rise environments. For example, these systems cannot distinguish between the point of origin of a signal emanating from the first floor or the forty-first floor of a high-rise building. Moreover, these systems cannot operate in areas where a single omni-directional cell base transmitter covers a wide area.

U.S. Pat. Nos. 5,388,149 and 5,334,974 teach a third category of devices which use Global Positioning System (GPS) satellite signals and a cellular telephone network to transmit location data to a central monitoring station. These systems are also designed for automobiles and incorporate features rendering them incapable of personal use. First these systems, directly receive incoming GPS satellite signals and therefore specify antenna sizes which are far too large for the miniaturization and concealment vital for personal use. Second, these systems compute their position solution and continually signal their position solution to the central monitoring station. These functions, while workable when using a car battery, may inoperably drain the battery of a personal device. Third, these systems teach voice communication over the cellular telephone. Such voice communication would interfere with the GPS receiver in a personal device. Moreover, these devices are inoperable in urban areas where the signal strength and frequency of the GPS satellite signals degrades anywhere near a building or even dense vegetation.

Consequently, there is a need in the personal security industry for a self-contained personal alarm device capable of signaling its location to a remote site. The present invention addresses this as well as other needs.

SUMMARY OF THE INVENTION

To overcome the limitations in the prior art described above, and to overcome other limitations that will become apparent upon reading and understanding the present specification, the present invention discloses a method, apparatus and system for signaling the location of an object to a remote site. In accordance with the invention, a personal alarm device is provided which includes a housing enclosing a controller, an antenna, and a transmitter and a receiver. The controller is coupled to the transmitter and receiver, which are in turn coupled to the antenna. The controller controls the transmitter and the receiver to receive position location signals, establish a cellular connection with a remote site, and transmit device location data to the remote site on the cellular connection, wherein the device location data indicates the location of the device.

In accordance with further aspects of the invention, the housing is sized so that the device is capable of being worn by a user. In this embodiment, the device may be concealed within an article capable of being worn by a user.

In accordance with further aspects the invention, the controller is configured to terminate the connection with the remote site after the transmission of the device location data to the remote site. The controller later reestablishes a connection with the remote site and retransmits new device location data.

In accordance with still further aspects of the invention, the device includes a high frequency transmitter coupled to the controller. The high frequency transmitter and the controller are configured to emit a high frequency signal after the termination of the connection with the remote site.

In accordance with still further aspects of the invention, the device includes a vibrator coupled to the controller. The vibrator and the controller are configured to vibrate the device after the transmission of the device location coordinates to the remote site.

In accordance with still further aspects of the invention, the device includes a signal processor responsive to an activation signal from the remote site for remotely activating the device.

In accordance with still further aspects of the invention, the system includes an array of cellular base stations and differential Global Positioning System (DGPS) receivers. The array of cellular base stations provides a personal communication network for telecommunication with the personnel alarm device. The array of DGPS receivers retransmit Global Positioning Satellite signals over the personnel communications network in order to provide position location signals to the personal alarm device on a cellular channel.

In accordance with still further aspects of the invention, the remote site includes a security station having a computing device. The computing device is configured to receive the device location data from the location signaling device and compute the location coordinates of the position signaling device using the device location data.

As will be appreciated from the foregoing brief summary of the invention, one object of the present invention is to provide a personal alarm device capable of signaling the location and identity of a victim in emergency situations.

Another object of the present invention is to enable a user to activate the personal alarm device without an assailant's knowledge so that the alarm signal cannot be interrupted or the assailant provoked.

Another object of the present invention is to provide a personal alarm device capable of being remotely activated. Remote activation may be especially beneficial for emergency circumstance involving a child or other person who is unable to activate the device by themselves. With remote activation, the personal alarm device may also be used to locate lost or injured pets or inanimate objects.

Another object of the invention is to rapidly and reliably locate a user in both densely populated, developed urban areas as well as rural areas. Further objects of the invention will become apparent upon reading and understanding the present specification.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiments, reference is made to the accompanying drawings which form a part hereof, and in which is shown by way of illustration specific embodiments in which the invention may be practiced. It is to be understood that other embodiments may be utilized as structural changes may be made without departing from the scope of the present invention.

Figure 1:
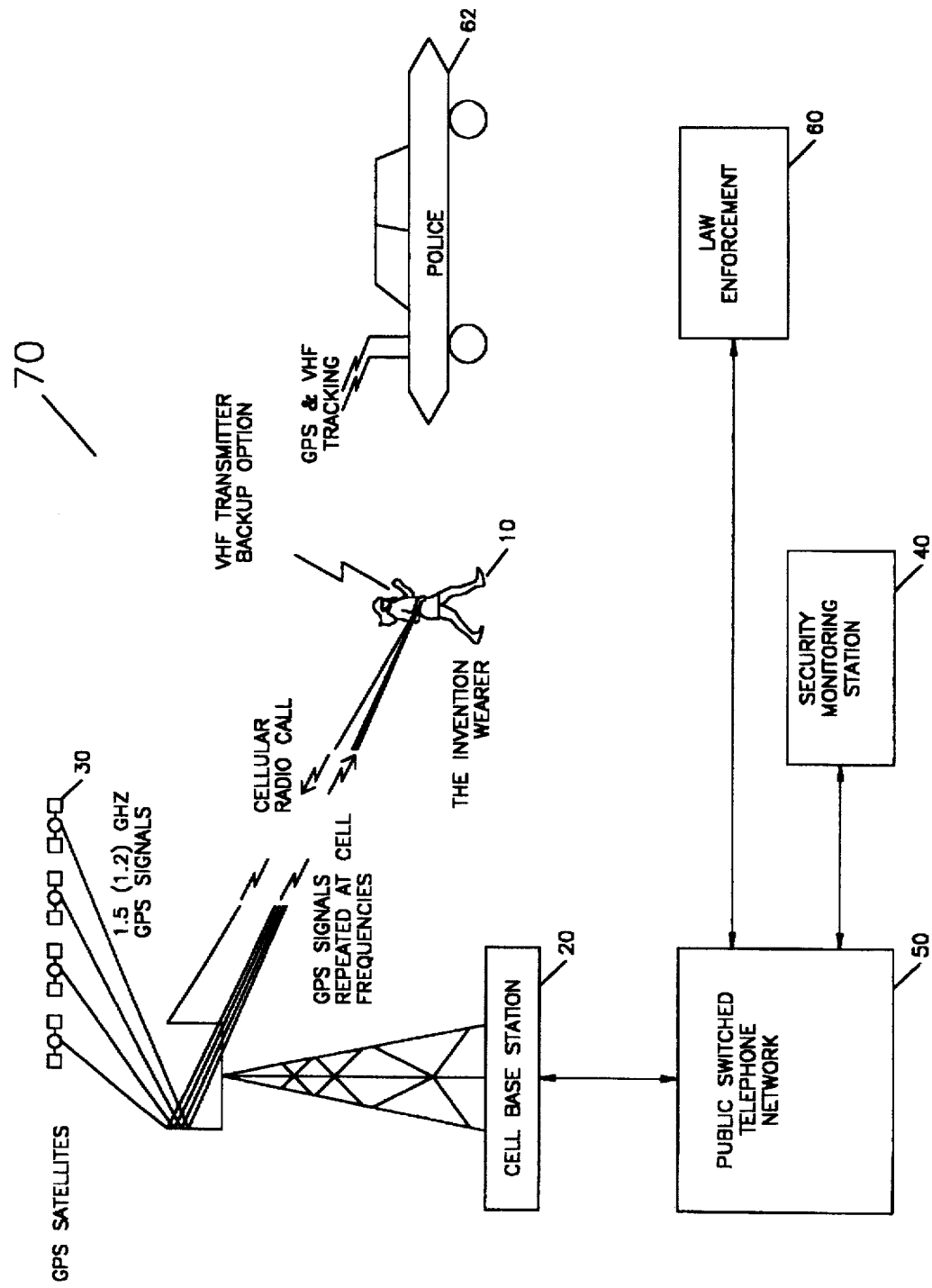
FIG. 1 is a pictorial diagram illustrating a general overview of an exemplary personal alarm system according to the principles of the present invention.

FIG. 1 is a pictorial diagram illustrating a general overview of an exemplary personal alarm system 70 according to the principles of the present invention. The system 70 includes a personal alarm device 10, a number of Global Positioning System (GPS) satellites 30, an array of cellular base stations 20, a security station 40 and locating agents for example, police 62. Though, the personal alarm device 10 is shown to accompany a person, it is noted that, alternatively, the personal alarm device 10 may be carried by an inanimate object, such as a valuable painting, an automobile, etc.

The array of cellular base stations 20 form a cellular network operated by a personal communication service (PCS). Personal communication services are many and vary depending on country and/or area of operation, but all contain similar system structure and monitoring and registration functions. Exemplary personal communication systems include AMPS, NAMPS, NMT, TACS, NTT, IDO, DDI, GSM, and TDMA. As is well known in the art, the cellular network operates over radio frequencies dedicated to cellular communication for providing wireless communication with cellular devices, such as cellular telephones, and, as will be described hereinafter, the personal alarm device 10.

Each GPS satellite 30 continuously emits a modulated GPS signal, carrying time and location data (hereinafter "GPS data"), as is well known in the art. The GPS signals are typically transmitted at frequencies of 1.5 or 1.2 gigahertz (GHz). However, due to the limitations of frequency and signal power, these GPS satellite signals can only be reliably received by a GPS receiver having an external antenna and operating in open areas. Buildings, trees, etc. render conventional GPS receivers useless.

To overcome these disadvantages, the present invention provides each cell base station 20 with a Differential Global Positioning System (DGPS) receiver for continuously retransmitting the satellite GPS signals on a cellular radio frequency channel. Details of the cell base stations 20 will be illustrated with reference to FIG. 2.

Each cell base station 20 includes an external antenna 201 tuned to 1.5 GHz or 1.2 Ghz and mounted appropriately to give reliable and constant reception of the GPS satellite signals. The antenna 201 is connected to the DGPS receiver 202 which receives and demodulates the modulated GPS satellite signals. The GPS data is then provided to an error correction device 203 which compensates for the delay associated with passing the GPS satellite signals through a cell base station 20, in a manner well known to the art. For example, compensation may include comparing the GPS satellite signal data with the known position of the DGPS receiver 202. The corrected GPS data is modified in data modifier 204 to be compatible with the local cellular radio system and then provided to combiner 205 which combines the modified GPS data (hereinafter "cellular GPS data") with cellular base station 20 cellular communication control data from receiver 210 and controller 212. The cellular GPS data is then remodulated by modulator 206 for transmission on a cellular radio frequency channel of the local PCS. Where cellular GPS data cannot be transmitted on the same channel with signals needed for cellular telephone system operation, or where the cellular GPS data transmission interferes with the operation of existing mobile stations, a separate set of control frequencies may be allocated for transmitting cellular GPS data. By using DGPS receivers 202, a continuous stream of GPS data is provided for any area covered by a cellular network. Thus, GPS data may be provided to areas unreachable by direct satellite transmission.

Figure 2:
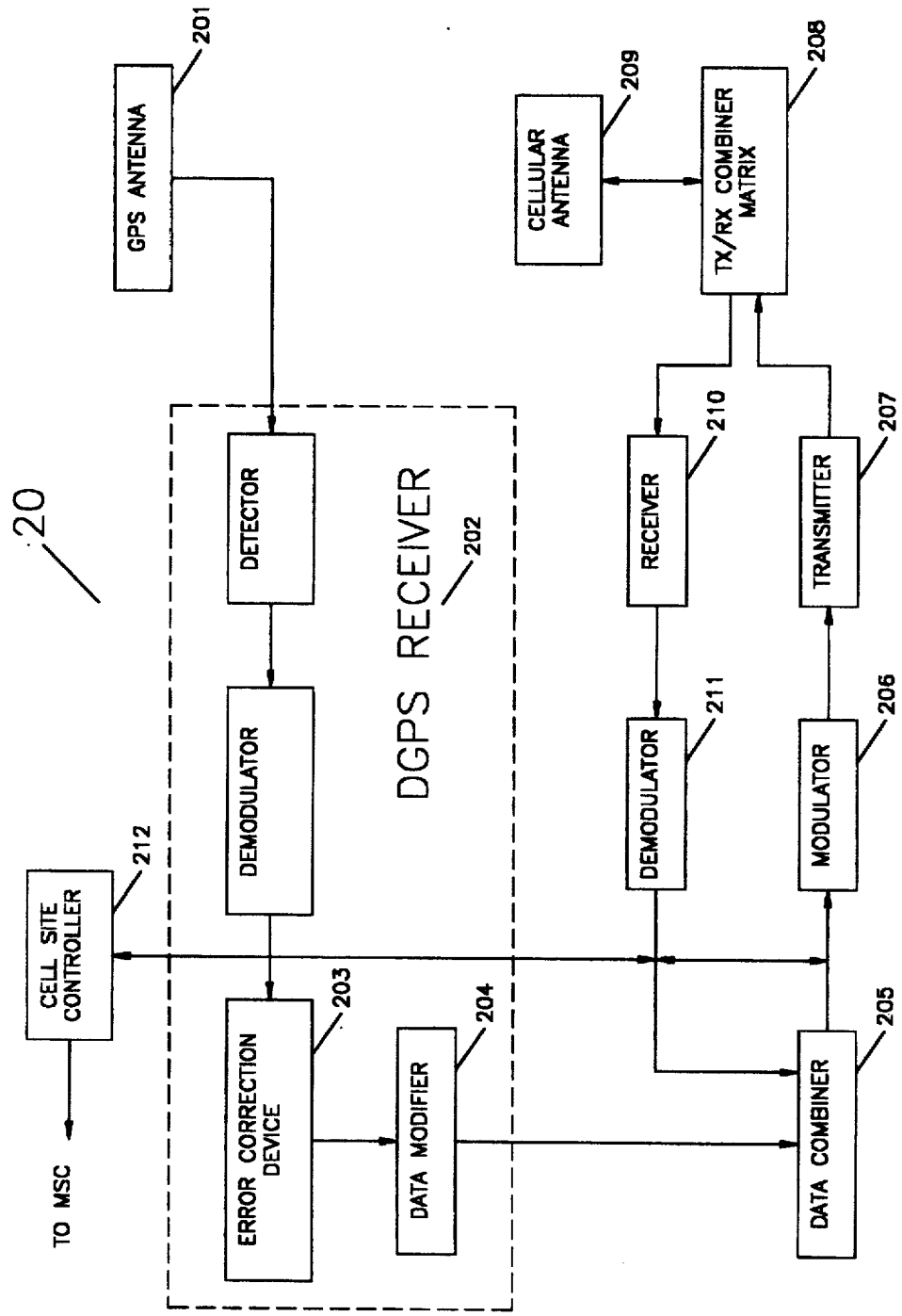
FIG. 2 is a block diagram of an exemplary cell base station.
Figure 3:
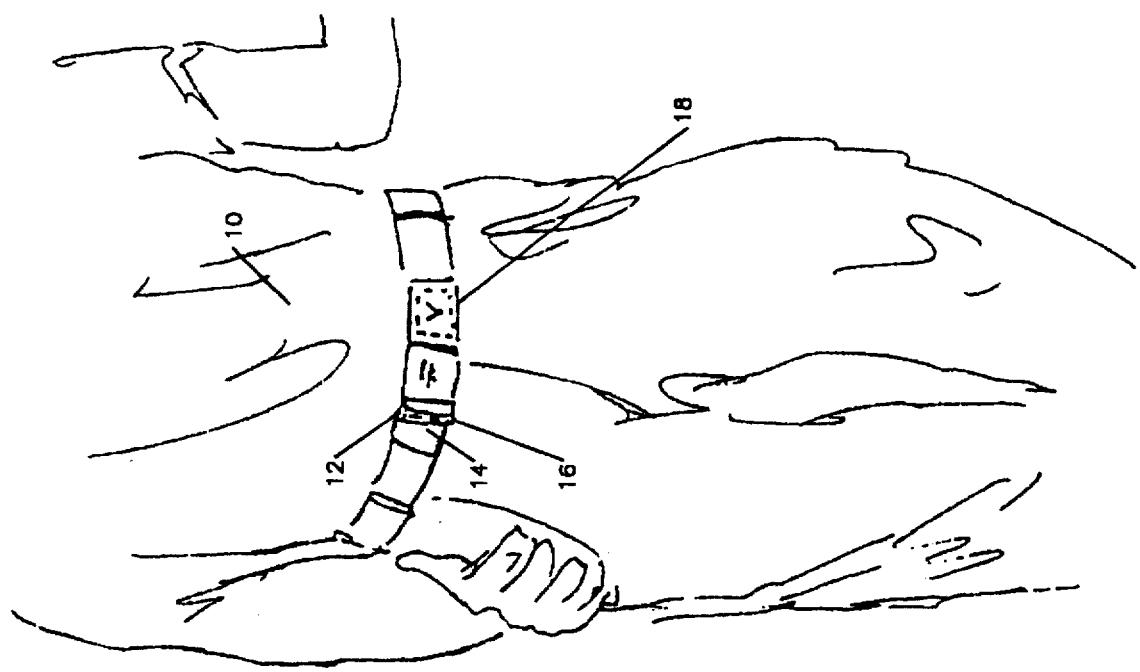
FIG. 3 is a pictorial diagram illustrating two exemplary embodiments of a personal alarm device.
Figure 3:
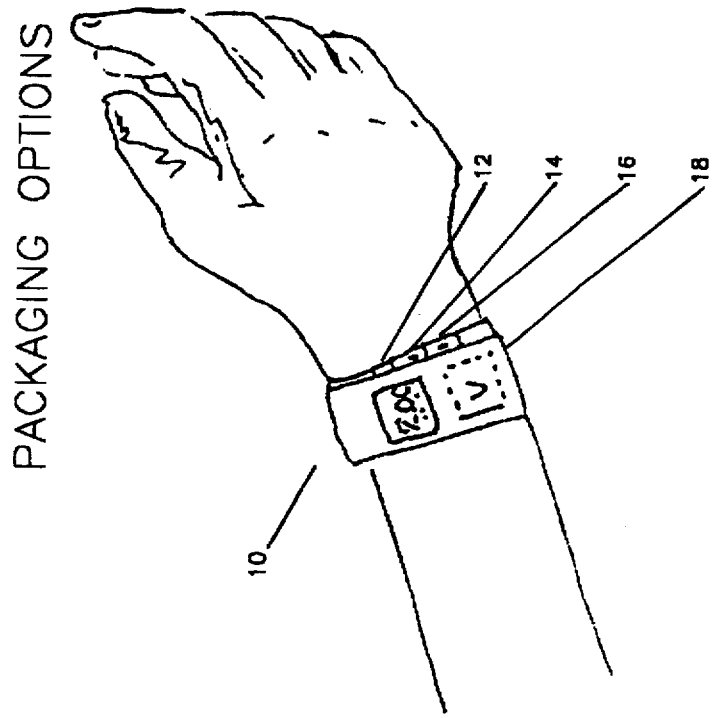
Figure 4:
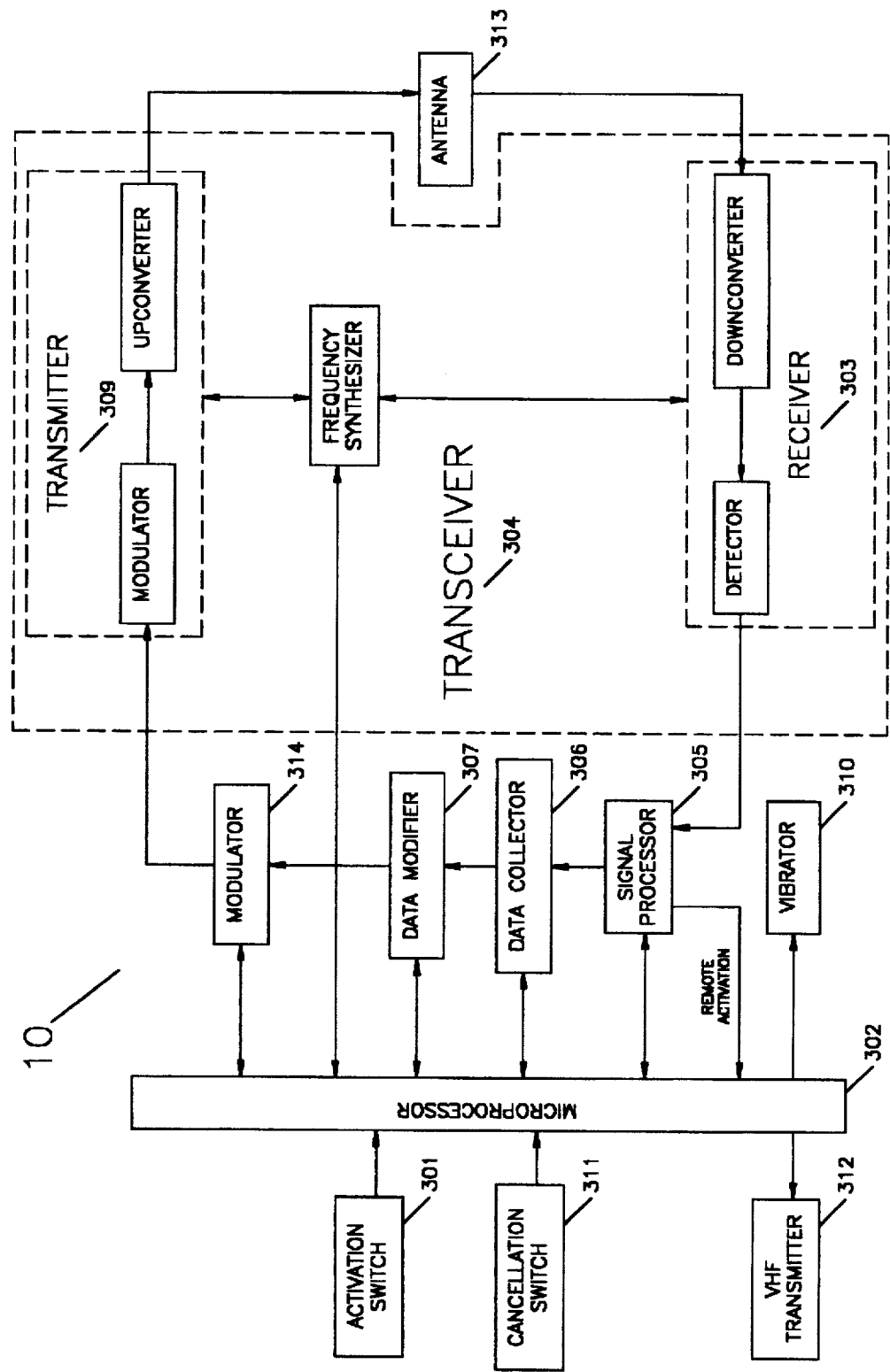
FIG. 4 is a block diagram of an exemplary personal alarm device.

FIGS. 2 and 3 illustrates an exemplary embodiment of the personal alarm device 10. The personal alarm device 10 is a self-contained, small mobile unit, which includes a cellular transceiver 304, an antenna 313 and a controller. The typical size of the personal alarm device is on the order of 50 to 100 cubic centimeters. As best shown in FIG. 3, the personal alarm device 10 may be concealed within a housing 12 having features making the personal alarm device 10 difficult to recognize by an assailant. Moreover, the housing may form a wristwatch, bracelet or other article capable of being worn by a user; thus, making it difficult for an assailant to remove the personal alarm device 10. In a wristwatch housing, the band of the wristwatch may include the antenna 313. The personal alarm device 10 may be battery operated by, for example, a 4.5 volt metal hydride battery.

The cellular transceiver 304 includes a cellular transmitter 309 and a cellular receiver 303. The transceiver 304 is coupled to the antenna 313 and is capable of receiving cellular radio frequency signals from the local personal communication service. The cellular radio frequency signals received by the transmitter 309 may include the cellular GPS signals emitted by the cell stations 20 and other signals, such as signals carrying data required to initiate a cellular communication link.

In alternate embodiments, the receiver 303 and transmitter 309 may comprise separate components. Moreover, it is noted that the present invention is not limited to the use of GPS derived signals. Any position location signals from which the position of a receiving device may be determined are within the scope of the invention. For example, cell sites 20 may emit position location signals which do not depend from satellite GPS signals. Moreover, position location signals may be broadcast over frequencies other than cellular frequencies and the receiver 303 configured to receive the particular broadcast frequency.

The controller includes a microprocessor 302 coupled to the transceiver 304. The microprocessor 302 interfaces with a signal processor 305 a data collector 306, a data modifier 307, and a control modulator 314. The signal processor 305 includes a demodulator and receives cellular GPS signals from the receiver 303. The signal processor 305 demodulates the cellular GPS signals and outputs the GPS data to a data collector 306. The signal processor 305 may further include logic, e.g., circuitry or programmed memory, to differentiate between cellular GPS signals and other incoming signals such as connection initiation signals or remote activation signals.

The data collector 306 resolves the cellular GPS signal into device location data such as the geo-coordinates of the device 10, and provides the device location data to the data modifier 302 when the data collector is polled by the microprocessor 302. Exemplary data collectors include Oncore sold by Motorola and Navcore sold by Rockwell. The data modifier 307 combines the geo-coordinate data with the mobile identification number (MIN) and Electronic Serial Number (ESN) of the personal alarm device 10 to form an emergency message, and modifies the emergency message to be compatible with the local cellular radio system. The emergency message may then by remodulated by the control modulator 314 and transmitted via transmitter 309 over the cellular network to the security station 40.

To establish a cellular communication link or connection with the security station 40, the microprocessor 302 dials the telephone number of the security station 40. This includes sending the telephone number and any required connection initialization signals to the data modifier 307. The telephone number of the security station as well as the MIN and the ESN of the personal alarm device 10, may be stored in a memory associated with the microprocessor 302.

The personal alarm device 10 may be activated by a user or remotely. For user activation, the personal alarm device 10 includes an activation which may be a button 14, as shown in FIG. 3. For remote activation, signal processor 305 includes logic for switch 301 activating the microprocessor 302 in response to an activation signal emitted by a cell site 20 and received via receiver 303.

In the event that the personal alarm device 10 has been operated by accident, the personal alarm device 10 may further include a cancellation switch 311, such as a button 16, as shown in FIG. 3. In addition, the signal processor 305 may include logic for deactivating the personal alarm device 10 in response to a cancellation signal received from the security station 40.

In many circumstances, a victim is moved to a location such as a basement or parking structure where the penetration of the cellular signal may be insufficient for receiving and transmitting position location data. To provide a backup location signal in these circumstances or in circumstances where the GPS signals are unreliable or indefinite, the personal alarm device 10 may further include a high frequency transmitter 312 for emitting an inaudible, low-powered signal. The high frequency transmitter 312 may be, for example, a miniature device, such as a VHF transmitter emitting a frequency in the 260 MHz to 300 MHz range and having power consumption of half to one watt. Such a transmitter requires little power and a short antenna length, yet still provides effective signal propagation. Moreover, such a transmitter emits no sound and thus will not tip off an assailant of an alarm.

The personal alarm device 10 may further include a vibrator 310 coupled to the microprocessor 302. As will be described more fully below, the microprocessor 302 vibrates the vibrator 310 to assure the user that the device 10 has transmitted an emergency message.

Figure 7:
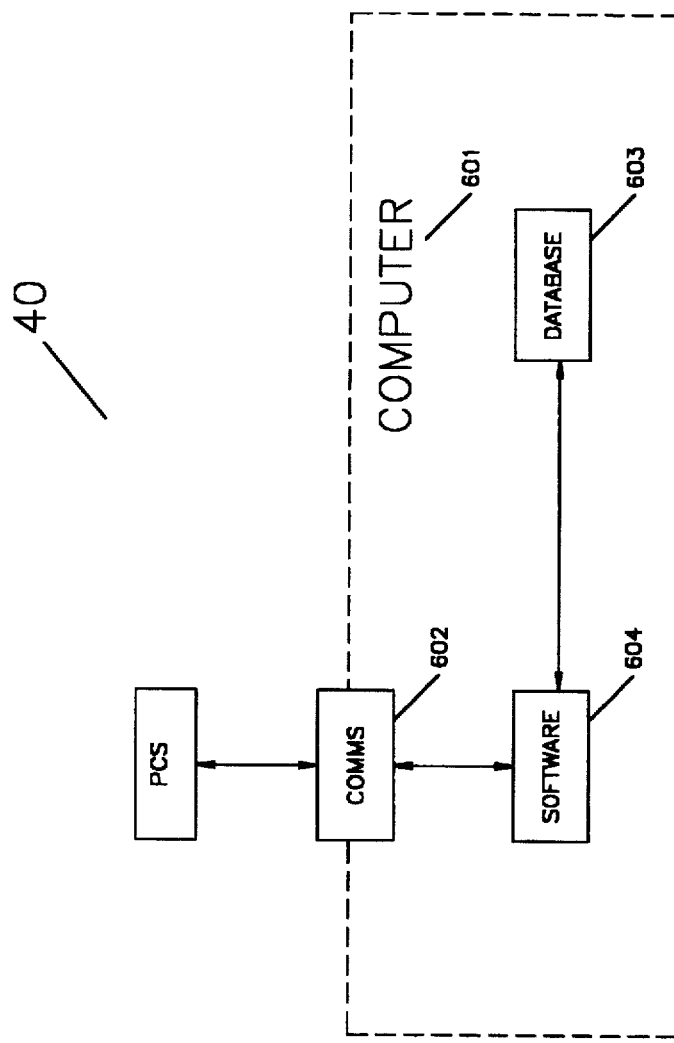
FIG. 7 is a block diagram of an exemplary computer of the security station.

Details of the security station 40 will be illustrated with reference to FIGS. 7 and 8. As shown in FIG. 7, the security station 40 includes a computing system, e.g., a computer 601, having a communications component 602, a software module(s) 604, and a database(s) 603. The communications component 602 includes hardware, such as a modem or facsimile machine, and associated software for receiving and transmitting data to and from the personal alarm device 10 via the local PCS. The database 603 contains user information, digitized street maps, and postal addresses for the users and region served by the security station 40. The database may be stored on a data storage device, for example, a disk drive of the computer 601. Alternatively, the database 603 may be stored on a separate computer.

The user information includes user name, home Address and map reference, work address and map reference, frequented sites, phone numbers, physical description, relevant personal history including medical history, etc. The user information may be retrieved by querying the database 603 using the MIN and ESN of the device 10. In this manner, the identity and other relevant information of the user of the device 10 may be determined and the user may be distinguished from other members of the database.

The computer 601 executes the software module 604 to perform the following functions. The computer 601 receives the geo-coordinate data of the personal alarm device 10, determines the integrity of the geo-coordinate data, and computes the latitude, longitude, and elevation of the device 10. The computer 601 also generates and transmits an acknowledgment code to the personal alarm device 10 when the data integrity is acceptable. The acknowledgment signal indicates to the personal alarm device 10 that an acceptable geo-coordinate data was transmitted. Each device 10 has its own acknowledgment code, which is stored in database 603. The computer further determines the street address of the user and retrieves the corresponding street map(s) by querying the database using the device location data. The computer 601 also queries the database using the MIN and ESN of the device to retrieve user information and the acknowledgment code of the device 10. The location coordinates of the device 10, i.e., the street address, street map, latitude, longitude, and elevation of the device 10, and the user information may be combined to form a data report, which may be displayed to the computer system operator and transmitted to a locating agent.

Figure 8:
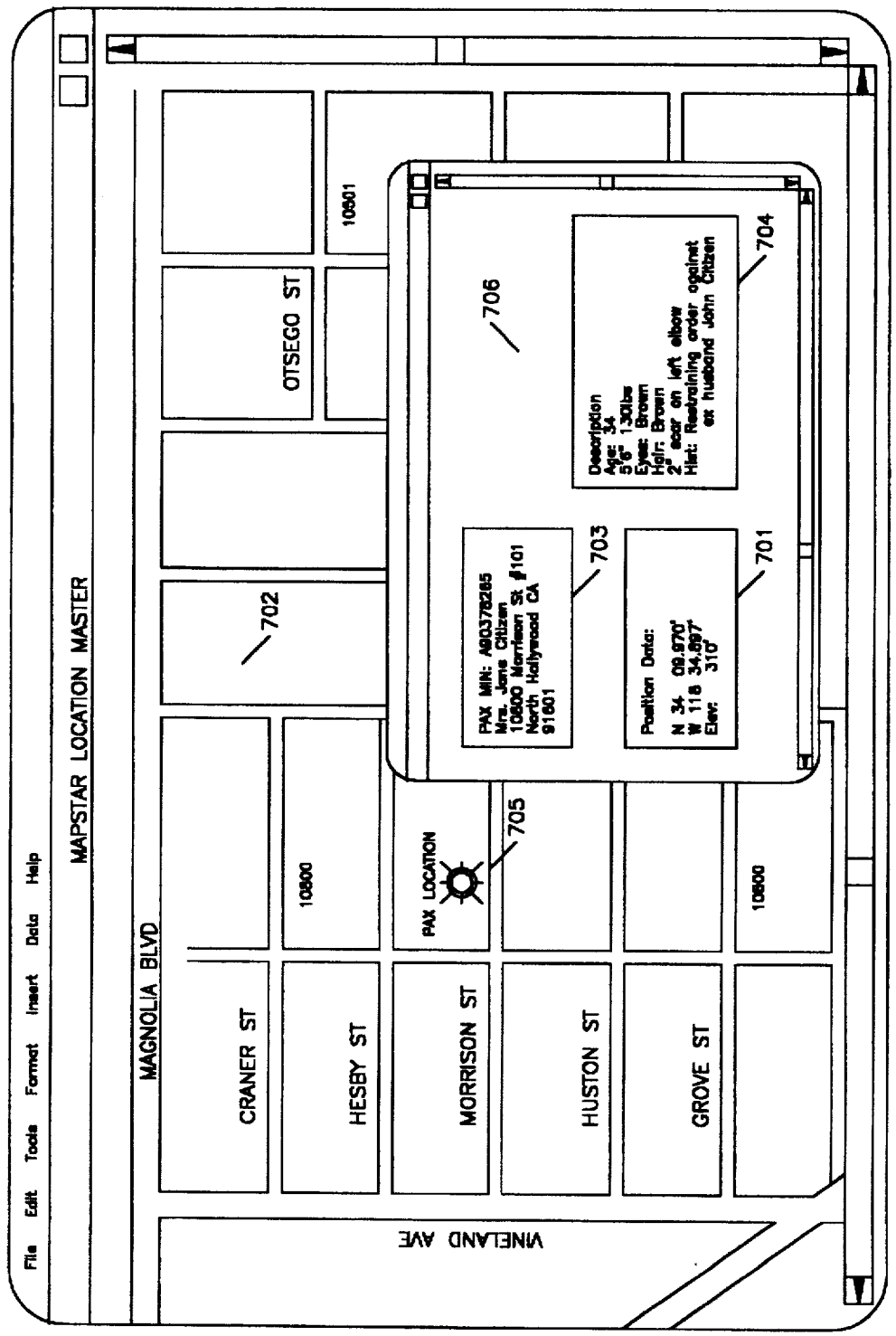
FIG. 8 is a pictorial diagram illustrating an exemplary data report generated by the computer.

FIG. 8 is a detailed illustration of the contents and display of the data report. The display includes a street map 702 of the region in which the personal alarm device 10 is located. The location of the device 10 on the street 15 by an indicated by an icon 705. The icon 705 may flash on the computer terminal. Within a subwindow 706, the display may provide a block 703 containing user address information, a block 704 containing the physical description of the user, and a block 701 containing position data of the user. The position data block 701 may contain the latitude, longitude, and elevation of the personal alarm device 10.

Figure 5:
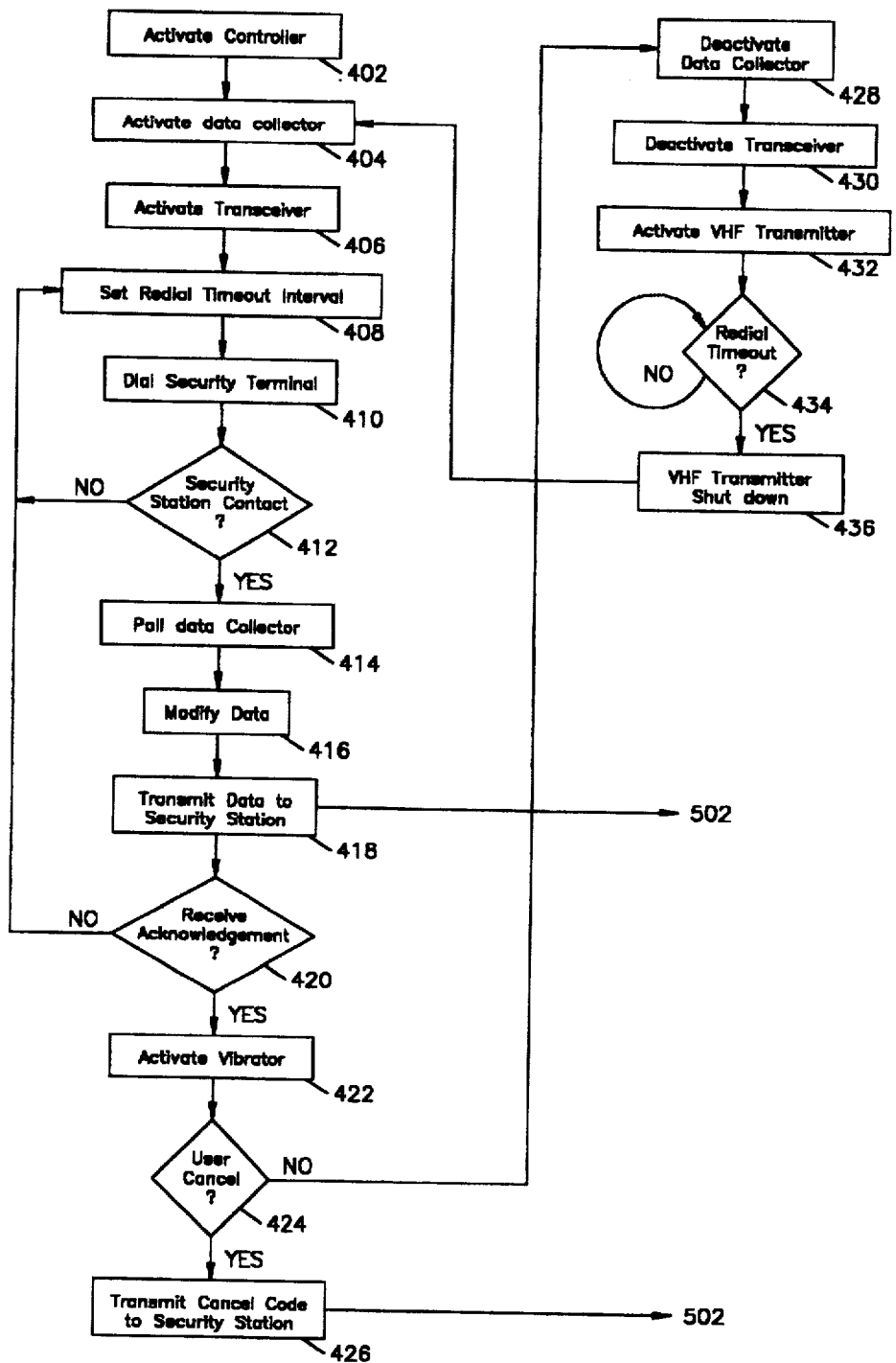
FIG. 5 is a flowchart depicting the steps performed by the personal alarm device of the present invention.
Figure 6:
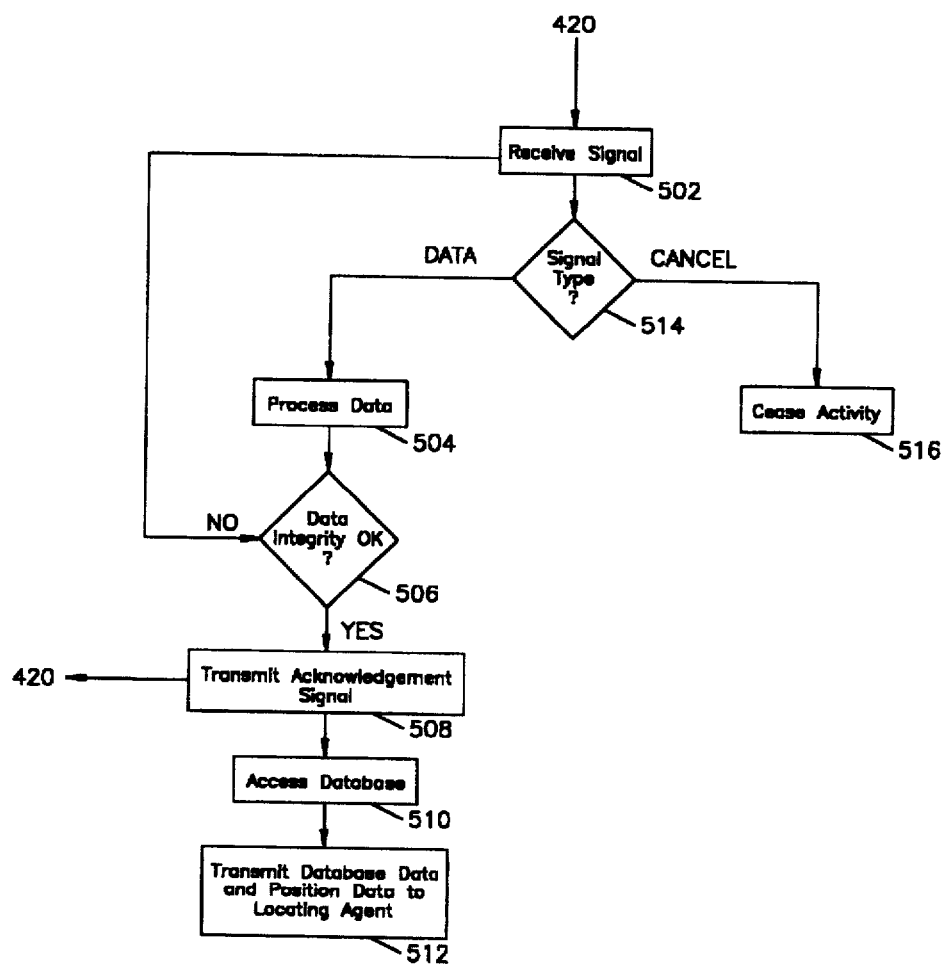
FIG. 6 is a flowchart depicting the steps performed by a security station of the present invention.

Further details of the present invention will be illustrated with reference to FIGS. 5 and 6. FIG. 5 illustrates the process flow of the personal alarm device 10. Block 402 represents the activation of the personal alarm device 10. This includes either activation by the user or remote activation. For remote activation, the receiver 303 receives an activation signal from the security station 40, the activation signal is recognized by the signal processor 305 and used to activate the microprocessor 302. Following block 402, the microprocessor 302 activates the GPS data collector 306, and the transceiver 304 as indicated at blocks 404 and 406. Thus, at substantially the same time, microprocessor 302 activates the GPS data collector 306 and receiver 303 receives the Location/Time data from GPS satellites via the cell sites 20, as described above.

Following block 406, a redial timeout interval is set in the microprocessor 302 as indicated by block 408. The redial timeout interval specifies the period of time for which the personal alarm device 10 is shut down before reactivation. Next, the personal alarm device 10 attempts to establish a connection with the security station, as indicated at block 410. This includes retrieving the telephone number of the security station 40 from the microprocessor 302 memory and transmitting the telephone number via the data modifier 307 and the modulator 314. If a communication link is formed, the data collector 306 is polled for geo-coordinate data, as indicated by decision diamond 412 and block 414; otherwise, control is moved to block 408 where the redial timeout interval is reset and the personal alarm device 10 again attempts to establish a connection.

After the data collector is polled, the data modifier 307 prepares an emergency message which is transmitted to the security station 40, as indicated by blocks 416 and 418. This includes combining the geo-coordinate data with the person alarm device MIN and ESN to generate the emergency message, modifying the emergency message and modulating the emergency message. The personal alarm device 10 then waits for an acknowledgment signal from the security station. If an acknowledgment signal is not received in a predetermined period of time, control moves to block 408 where the redial timeout interval is reset and the personal alarm device 10 attempts to retransmit an emergency message, as indicated by decision diamond 420. Thus, if the call is unsuccessful the microprocessor 302 will continually redial the security station 40 until an acknowledgment signal is received 420. When the acknowledgment signal is received, the microprocessor activates the vibrator for 10 seconds to alert the user of the personal alarm device 10 that the distress call has been received, as indicated by decision diamond 420 and block 422.

After the vibrator has been activated, the microprocessor determines whether a cancellation has been requested as indicated by decision diamond 424. If a cancellation is requested, the personal alarm device 10 transmits a cancellation signal to the security station and deactivates itself, as indicated by decision diamond 424 and block 426; otherwise control moves to block 428. It is noted that the inquiry as to whether a cancellation request has been received may be done at any time after the device 10 has been activated.

After an acknowledgment signal has been received, the transceiver 304 and data collector 306 are shut down as indicated by blocks 428 and 430. It is noted that the transceiver and data collector may be shut down in any order or simultaneously. Following shut down, the VHF transmitter 312 is activated as indicated at block 432. While the VHF transmitter 312 emits a VHF signal, the microprocessor 302 loops to determine whether the redial timeout interval has elapsed, as indicated by decision diamond 432. If the redial timeout interval has elapsed, control moves to block 436, where the VHF transmitter 312 is shut down. Following block 436, control moves to block 404 where the personal alarm device 10 activates the data collector and repeats the steps to reinitiate contact with the security station.

The process of terminating the communication link, shutting down the transceiver and data collector, and then reinitiating communication conserves battery life yet still enables the security station to locate the personal alarm device 10 if it has been moved from the original distress call location. In addition, in this embodiment, the VHF Transmitter is activated after shutting down the transceiver 304 and the data collector 306. Thus, battery power is conserved and interference between the transmitters is eliminated.

FIG. 5 illustrates the process flow at the security station 40. Block 502 represents the security station 40 receiving a transmission from the personal alarm device 10. As indicated above, this transmission may include a number of signals, such as a cancellation signal or an emergency message. If the transmission is includes an emergency message, then the data is processed, as indicated by decision diamond 514 and block 504; otherwise, if the transmission includes a cancellation signal, the activity at the security station 40 ceases, as indicated by decision diamond 514 and block 516.

The processing at block 504 is performed by computer 601 and includes receiving the emergency message via communications component 602 and downloading the geo-coordinate, MIN, and ESN data into the computer 601. Using the software module 604, the computer 601 resolves the geo-coordinate data to produce the location coordinates of the device 10. The computer 601 may also determine if the user is at his or her home or a frequented site by cross-referencing the street address of the device 10 with the home address and frequented sites of the user. The processing step further includes determining the integrity of the geo-coordinate data, as well known in the art. If the integrity exceeds a predetermined threshold, an acknowledgment signal is transmitted to the personal alarm device 10, as indicated by decision diamond 506 and block 508. If the data integrity falls below the threshold, no acknowledgment signal is sent and the security station waits for the next incoming signal, as indicated by decision diamond 506 and block 502.

Following block 508, the computer 601 accesses the database 603 and retrieves street maps, the street address of the device 10, and user information, as indicated at block 510. As discussed above, the user information is retrieved by querying the database 603 using the personal alarm device 10 MIN and ESN while the street maps and street address are determined by querying the database 603 using the geo-coordinates the device 10. The coordinates of the personal alarm device 10 and the user information may then be compiled into a data report, displayed, and forwarded to locating agents, as indicated at block 512.

The law enforcement service may be provided with GPS devices and VHF tracking devices. In situations where the personal alarm device 10 location coordinates and the wearer's address coincide, the data report may direct the law enforcement service to proceed to the victim's address. However, if the personal alarm device 10 location coordinates indicate that the user is in another location, the law enforcement service may activate their own GPS devices and enter the coordinates of the personal alarm device 10 wearer. In this manner, the law enforcement service may determine their position relative to the personal alarm device 10 and easily navigate to the user's location. The law enforcement service may further activate the VHF signal tracking device to acquire a fix on the VHF signal emitted by the VHF transmitter 312.

In an alternate embodiment, personal alarm device 10 does not rely on cellular GPS signals to signal its location. In this embodiment, the personal alarm device 10 includes a cellular transmitter and a high frequency transmitter. The cellular transmitter is configured to establish a connection with the remote site whereby a first device location region may be determined, for example, by triangulation using the signal strength of the personal device's cellular transmission. The second transmitter may be configured to emit a signal identifying a second device location region, wherein the second device location region identifies a smaller area than the first device location region. The second transmitter may be a high frequency transmitters, such as a VHF or UHF transmitter.

The foregoing description of embodiments of the present invention has been presented for the purposes of illustration and description. It is not intended to be exhaustive or to limit the invention to the precise form disclosed. Many modifications and variations are possible in light of the above teaching. For example, the present invention may be used as a navigational system whereby vehicle drivers may plot a course to a desired destination. It is intended that the scope of the invention not be limited by this detailed description, but rather extend to cover the full and fair scope of the claims set forth below.

What is claimed is:

1. A method of providing the location of a device to a remote site, wherein the device includes a transmitter and a receiver, comprising the steps of:

(a) establishing a connection with the remote site using the transmitter, wherein the connection is established on a cellular frequency;

(b) receiving position location signals with the receiver, the signals being GPS signals modified for transmission at a cellular frequency and combined with cellular communication control data from a cellular signal and from a cellular site controller;

(c) communicating device location data to the remote site over the cellular frequency connection, wherein the device location data is derived from the position location signals;

(d) terminating the cellular connection after step (d); and (e) periodically repeating steps (a)–(e), such that the connection is discontinuous and the device location data is intermittently communicated to the remote site.

2. The method of claim 1, including transmitting a high frequency signal after the terminating step (e) such that the high frequency signal may be received by a high frequency receiver to facilitate locating the position of the device.

3. The method of claim 1, wherein the device location data is derived from the position location signals using a data collector, and including polling the data collector after the establishing a connection step (a).

4. The method of claim 1, including
   receiving an acknowledgment signal from the remote site, wherein the acknowledgment signal indicates that the device location data was communicated to the remote site; and
   vibrating the object in response to the acknowledgment signal.

5. A self-contained personal location device capable of signaling its location to a remote site, comprising:

(a) a housing;

(b) an antenna enclosed within the housing;

(c) a transmitter and a receiver, each coupled to the antenna and enclosed within the housing;

(d) a controller, coupled to the transmitter and receiver, for controlling the transmitter and the receiver to receive position location signals, to establish a cellular connection with a remote site on a cellular frequency, and transmit device location data to the remote site on the cellular connection, wherein the device location data is derived from the position location signals, wherein there are means provided for use by the personal location device, such means being means for modifying GPS signals for transmission at the cellular frequency as the position location signals, and
   means for combining cellular communication control data with the modified GPS signals, and means for transmitting the modified GPS signal on the cellular frequency to the personal location device.

6. The personal location device of claim 5, wherein the housing is sufficiently small in size so that the device is capable of being worn by a user.

7. The personal location device of claim 6, wherein the device is concealed within an article capable of being worn by a user.

8. The personal location device of claim 5, wherein the controller is configured to terminate the connection with the remote site after the transmission of the device location data to the remote site.

9. The personal location device of claim 8, further including a high frequency transmitter coupled to the controller, wherein the high frequency transmitter and the controller are configured to emit a high frequency signal after the termination of the connection with the remote site.

10. The personal location device of claim 8, wherein the controller is configured to reestablish a connection with the remote site and retransmit new device location data.

11. The personal location device of claim 5, wherein the receiver is capable of receiving an activation signal to activate the controller, and including a signal processor coupled to controller, the signal processor being configured to differentiate between position location signals and the activation signal.

12. The personal location device of claim 11, including an activation circuit associated with the signal processor, wherein the activation circuit activates the controller in response to an activation signal.

13. The personal location device of claim 11, wherein the signal processor includes a demodulator coupled to the receiver, and wherein the demodulator is configured to demodulate position location signals received by the receiver.

14. The personal location device of claim 5, including a frequency synthesizer configured to synthesize the frequencies on which the transmitter and the receiver operate.

15. The personal location device of claim 5, wherein the transmitter and receiver are configured to form a transceiver.

16. The personal location device of claim 5, including a cancellation device coupled to the controller for deactivating the device.

17. A device claim 5 wherein the GPS signals include both GPS position data and GPS timing data.

18. The personal location device of claim 5, further including a high frequency transmitter coupled to the controller, wherein the high frequency transmitter and the controller are configured to emit a high frequency signal after the termination of the connection with the remote site.

19. The personal location device of claim 5, wherein the controller is configured to reestablish a connection with the remote site and retransmit new device location data.

20. A self-contained personal location device capable of signaling its location to a remote site, comprising:

(a) a housing;

(b) an antenna enclosed within the housing;

(c) a transmitter and a receiver, each coupled to the antenna and enclosed within the housing;

(d) a controller, coupled to the transmitter and receiver, for controlling the transmitter and the receiver to receive position location signals, to establish a cellular connection with a remote site on a cellular frequency, and transmit device location data to the remote site on the cellular connection, wherein the device location data is derived from the position location signals; wherein the housing has a volume on the order of 50 to 100 cubic centimeters; and wherein there are means provided for use by the personal location device, such means being means for modifying GPS signals for transmission at the cellular frequency; means for combining cellular communication control data with the modified GPS signal; and means for transmitting the modified GPS signals on the cellular frequency to the personal location device.

21. The personal location device of claim 20, wherein the controller is configured to terminate the connection with the remote site after the transmission of the device location data to the remote site.

22. The personal location device of claim 20, wherein the receiver is capable of receiving an activation signal to activate the controller, and including a signal processor coupled to the controller, the signal processor being configured to differentiate between position location signals and the activation signal.

23. The personal location device of claim 20, including a frequency synthesizer configured to synthesize the frequencies on which the transmitter and the receiver operate.

24. The personal location device of claim 20, including a cancellation device coupled to the controller for deactivating the device.

25. The personal location device of claim 20, further including a vibrator coupled to the controller, wherein the vibrator and the controller are configured to vibrate the device after the transmission of the received position location signal to the remote site.

26. A self-contained personal location device capable of signaling its location to a remote site, comprising:

(a) a housing;

(b) an antenna enclosed within the housing;

(c) a transmitter and a receiver, each coupled to the antenna and enclosed within the housing;

(d) a controller, coupled to the transmitter and receiver, for controlling the transmitter and the receiver to receive position location signals, to establish a cellular connection with a remote site on a cellular frequency, and transmit device location data to the remote site on the cellular connection, wherein the device location data is derived from the position location signals; and (e) a vibrator coupled to the controller, wherein the vibrator and the controller are configured to vibrate the device after the transmission of the received position location signal to the remote site; and wherein there are means provided for use by the personal location device, such means being means for modifying GPS signals for transmission at the cellular frequency, means for combining cellular communication control data with the modified GPS signals, and means for transmitting the modified GPS signals on the cellular frequency to the personal location device.

27. A personal location system capable of signaling the location of an object to a remote station, comprising:

a network of cellular base stations, each base station having a transmitter for transmitting a modified Global Positioning System (GPS) signal over a cellular frequency and means for combining the modified cellular GPS signals with cellular communication control data;

a location signaling device associated with the object, including:

a cellular transmitter and a cellular receiver; and a controller coupled to the transmitter and receiver, the controller configured to control the transmitter and the receiver to receive the modified cellular GPS signals, establish a cellular connection with the remote station, and transmit device location data to the remote station over the cellular connection, wherein the device location data is derived from the modified GPS signals;

wherein the remote station includes a computing device configured to receive the device location data from the location signaling device to compute the location coordinates of the position signaling device using the device location data.

28. The personal location system of claim 27, wherein the computing device is configured to transmit the location coordinates of the location signaling device to a locating agent.

29. The personal location system of claim 27, wherein each cellular base station includes a differential Global Positioning System (DGPS) receiver coupled to an antenna and the transmitter, the DGPS receiving GPS satellite signals and repeating the satellites signals over a cellular frequency.

30. A personal location system capable of signaling the location of an object to a remote station, comprising:

a network of cellular base stations, each base station having a transmitter for transmitting a modified Global Positioning System (GPS) signal over a cellular frequency;

a location signaling device associated with the object, including:
(a) a cellular transmitter and a cellular receiver; and
(b) a controller coupled to the transmitter and receiver, the controller configured to control the transmitter and the receiver to receive the cellular GPS signals, establish a modified cellular connection with the remote station, and transmit device location data to the remote station over the cellular connection, wherein the device location data is derived from the GPS signals;

wherein the remote station includes a computing device configured to receive the device location data from the location signaling device, and compute the location coordinates of the position signaling device using the device data;

wherein each cellular base station includes a differential Global Positioning System (DGPS) receiver coupled to an antenna and the transmitter, the DGPS receiving GPS satellite signals and repeating the satellite signals over a cellular frequency; and wherein each cellular base station includes a data combiner coupled between the DGPS receiver and the transmitter, wherein the data combiner combines the GPS signal with cellular communication control data such that the control data and the GPS signal may be transmitted over the same cellular frequency channel.

31. A personal location system as claimed in claim 30 wherein the location signaling device comprises:

a cellular transmitter configured to communicate with a first cellular base station in the network and to establish a connection with the remote site whereby a first device location region may be determined; and a the cellular transmitter being configured to communicate with a second cellular base station in the network and to establish a connection with the remote site and to emit a signal identifying a second device location region, wherein the second device location region identifies a small area within the first device location region.

32. The personal location device of claim 31, wherein the second transmitter includes a high frequency transmitter.

33. A personal location system as claimed in claim 22 wherein the location signaling device comprises:

a cellular transmitter configured to communicate with a first cellular base station in the network and to establish a connection with the remote site whereby a first device location region may be determined;

a the cellular transmitter being configured to communicate with a second cellular base station in the network and to establish a connection with the remote site and to emit a signal identifying a second device location region, wherein the second device location region identifies a small area within the first device location region; and wherein the connection with the remote site is effected by modified GPS signals transmitted on a respective cellular frequency channel.

34. The personal location device of claim 33 wherein the modified GPS signal includes both GPS position data and GPS timing data.

35. A method of providing the location of a device to a remote site, wherein the device includes a transmitter and a receiver, comprising the steps of:

(a) establishing a connection with the remote site using the transmitter, wherein the connection is established on a cellular frequency;

(b) receiving position location signals with the receiver, the signals being GPS signals modified for transmission at a cellular frequency;

(c) communicating device location data to the remote site over the cellular frequency connection, wherein the device location data is derived from the position location signals;

(d) modifying the GPS signal for transmission on a cellular frequency channel;

(e) combining cellular communication control data from a cellular signal and from a cellular site controller; and (f) subsequently transmitting the modified GPS signal on the cellular radio frequency.

36. A method of claim 35 wherein the GPS signals include both GPS position data and GPS timing data.

37. A method of claim 35 including modifying the GPS signal for transmission on a cellular frequency channel, combining cellular communication control data from a cellular signal receiver and from a cellular site controller, and subsequently transmitting the modified GPS signal on the cellular radio frequency.

* * * * *